United States Patent [19]
Valyi

[11] Patent Number: 5,661,889
[45] Date of Patent: Sep. 2, 1997

[54] PROCESS FOR PRODUCING A CONTAINER AND CLOSURE ASSEMBLY

[76] Inventor: Emery I. Valyi, 102 Moseman Ave., Katonah, N.Y. 10536

[21] Appl. No.: 465,438

[22] Filed: Jun. 5, 1995

Related U.S. Application Data

[63] Continuation-in-part of Ser. No. 372,021, Jan. 12, 1995.

[51] Int. Cl.⁶ .................... B29D 22/00; B29C 69/00; B67B 3/00; B65D 53/00
[52] U.S. Cl. .................... 29/416; 29/412; 29/414; 29/425; 53/452; 53/471; 53/486; 264/152; 264/159; 264/268; 264/322; 215/253; 215/270; 215/303; 220/240; 220/254; 220/258; 220/276; 220/657
[58] Field of Search .................... 29/412, 413, 414, 29/416, 425, 453; 53/452, 471, 485, 486, 487; 264/152, 157, 159, 268, 295, 296, 322; 220/240, 254, 255, 258, 276, 657; 215/226, 230, 250, 253, 303, 346, 270

[56] References Cited

U.S. PATENT DOCUMENTS

| | | | |
|---|---|---|---|
| 3,292,252 | 12/1966 | Reading | 264/152 X |
| 3,328,498 | 6/1967 | Cheney | 264/152 X |
| 3,374,527 | 3/1968 | Jarrett | 264/152 X |
| 3,415,405 | 12/1968 | Rausing et al. | 215/270 X |
| 3,632,717 | 1/1972 | Showalter et al. | 264/152 |
| 3,804,282 | 4/1974 | Komendowski | 215/32 |
| 4,673,096 | 6/1987 | Towns et al. | 215/270 X |
| 4,747,501 | 5/1988 | Greaves | 215/253 |
| 4,771,905 | 9/1988 | Perne et al. | 215/270 |
| 4,796,766 | 1/1989 | Clark | 264/159 X |
| 5,115,938 | 5/1992 | Thompson | 220/618 |
| 5,116,213 | 5/1992 | Zilbert | 425/183 |
| 5,213,753 | 5/1993 | Przytulla | 264/152 X |
| 5,242,073 | 9/1993 | Willis et al. | 220/240 |
| 5,297,599 | 3/1994 | Bucheli | 141/329 |
| 5,325,976 | 7/1994 | Valyi et al. | 215/232 |
| 5,528,814 | 6/1996 | Luch et al. | 264/295 X |

*Primary Examiner*—S. Thomas Hughes
*Attorney, Agent, or Firm*—Bachman & LaPointe, P.C.

[57] ABSTRACT

A process for producing a container and closure assembly includes molding a preliminary container including a closed bottom portion, a body portion and a shoulder and neck portion. The shoulder and neck portion is separated from the body portion. An open ended second container is formed from the body portion, the second container having a rim at its open end and an encircling wall. The open end of the second container is then closed with a closure comprised of a cap and a cap liner. The cap liner has a weakened portion adapted to be broken by the cap. The cap or the cap liner are formed from the shoulder and neck portion of the preliminary container.

18 Claims, 5 Drawing Sheets

PROCESS FOR PRODUCING A CONTAINER AND CLOSURE ASSEMBLY

CROSS-REFERENCE TO RELATED APPLICATION

This application is a continuation-in-part of U.S. patent application Ser. No. 08/372,021, filed Jan. 12, 1995.

BACKGROUND OF THE INVENTION

This invention relates to containers and closures, and more particularly, to a container having a removable, fluid sealable closure, especially gas sealable, which upon removal leaves an open drinking glass.

Typical commercial containers for holding carbonated beverages are glass bottles or metal cans having screw caps and tabs, respectively, for opening same. The caps and tabs are securely and sealably attached to the bottles and cans, respectively, for sealing in all fluids, including gases associated with carbonation. After removing the cap or tab, drinking the contents of the container is cumbersome, often unhygienic, preferably requiring a separate glass or cup. Such opened cans and bottles are typically usable only for recycling, unless altogether discarded.

Primary design features of commercial containers which makes them inconvenient and unaesthetic from which to drink, and even less for continued home use, are the threaded small opening, as with a bottle, or the even smaller opening given by the tab, which may have gathered dirt, as with a can. With these types of closures, consumers of the beverages are inconvenienced, nor do they have any incentive to keep the containers for re-use. Accordingly, common shortcomings of commercial containers lie in their shape and in the closures typically used for them.

Existing bottles, whether made of glass or plastic, must have a small opening from which to dispense, if they are to retain pressure, because closures for large openings, such as for a drinking glass, cannot be afforded, and would be very cumbersome to remove, even if they existed.

Plastic containers are generally preferred by the public. It is, therefore, desirable to provide a plastic container with a wide enough opening from which to drink, necessitating a corresponding closure.

U.S. Pat. No. 5,325,976 to Valyi et al. discloses such a closure assembly that is economically acceptable and wherein threads or tabs are not used. The assembly includes a plastic container, a barrier and over it a closure member. The barrier and the closure member completely cover the access opening to the container and the barrier includes a weakened portion which is broken by action of the closure member, whereby substantially all of the barrier is removable from the full opening of the container. Accordingly, the container closure assembly includes a seal which does not use threads nor tabs and is protected from contamination. The container disclosed in the patent may be a typical, narrow-neck bottle used for carbonated and other beverages such as soda and juice, or a wide-mouth container.

There exists a need in the container art for a container, particularly one made of plastic, in the form of an aesthetically pleasing drinking glass or the like and a closure therefore that is fluid, especially gas sealable over a wide opening, readily removable and hygienic, as for example the one disclosed in the foregoing patent.

SUMMARY OF THE INVENTION

The primary object of this invention is to provide a user friendly, aesthetically pleasing container and closure assembly, preferably made of plastic, wherein beverages, including carbonated beverages, can be stored and from which the said beverages can be conveniently consumed.

Another object of this invention is to provide a reclosable container and closure assembly, including one that retains carbonation until first opened.

Another object of this invention is to provide a container and closure assembly wherein the closure sealably closes the container for maintaining carbonation, if required, while the container has the shape of a drinking glass or cup having a rim adapted for convenient use.

Still another object of this invention is to provide a container and closure assembly wherein advertisement or the like can be placed on the closure so as to minimize the cost of decorating the container itself.

Still other object of this invention is to provide a method for the production of said container and closure assembly from plastic materials, at reasonable cost.

The above objects and more are achieved by the container and closure assembly of the present invention. The assembly comprises a container including a bottom portion and an encircling wall extending therefrom and defining a body portion. The body portion has a wide, cup-like open end with a span equal to or different than the span of the body portion, as for example, greater than the span of parts of the body portion. The assembly also includes a closure composed of a removable cap liner carrying means for engaging the container at its open end to close the container in a manner which retains fluids in the container, especially gases, and a removable cap over the cap liner and thereby over the open end of the container. The cap and liner are adapted for reclosing the container after removal.

In one embodiment of the invention, the container and either the cap or the cap liner may be formed from the same molded piece; the container is a drinking glass; and the container includes a lip portion located at the open end made convenient for drinking, in engagement with the portion of the cap liner remaining attached to said lip portion upon opening of the container.

In a preferred embodiment, the container and a closure are formed from the same molded piece and the closure comprises a cap liner with a separately molded cap placed over the cap liner.

A process for producing the container and closure of the present invention includes the steps of molding a preliminary container, as an oriented preliminary container, including a closed bottom portion end, a body portion and a shoulder and neck portion; separating the shoulder and neck portion from the body portion of the preliminary container; forming an open ended second container from the body portion, the second container having an encircling wall with an inner and outer surface; forming a closure from the shoulder and neck portion; and attaching the closure to the second container, wherein the closure is fitted over the second container at its open end to close said second container. In a preferred embodiment, the closure comprises a cap liner and the process includes the step of placing a cap over the cap liner. In an additional embodiment of the present invention, a cap is formed from the shoulder and neck portion, including the steps of providing a cap liner and attaching the cap liner to the second container, wherein the cap liner engages the second container at its open end to close said second container, and placing a cap over the cap liner.

In accordance with the present invention, the cap liner sealably engages the second container at its open end in a manner which retains fluids in the second container.

In one embodiment, the second container includes an outwardly extending flange shaped into a sealing configuration with the cap liner.

In a further embodiment, the present invention comprises: a container including a bottom portion and an encircling wall extending therefrom and defining a body portion, wherein the body portion has an open end defined by a rim; a removable cap liner including means for sealably engaging the container at its open end in a manner which retains fluids in the container; and a removable cap over the cap liner and thereby over the open end of the container including means to break the cap liner and open the container upon movement of the cap; a plurality of pressure-release vents in the cap liner and means for closing the vents in the cap; whereby, pressure is released from the pressure-release vents upon moving the cap followed by breaking the cap liner upon continued movement of the cap.

The details of the present invention are set out in the following description and drawings wherein like reference characters depict like elements.

DETAILED DESCRIPTION OF THE PREFERRED EMBODIMENT

Figure 1:
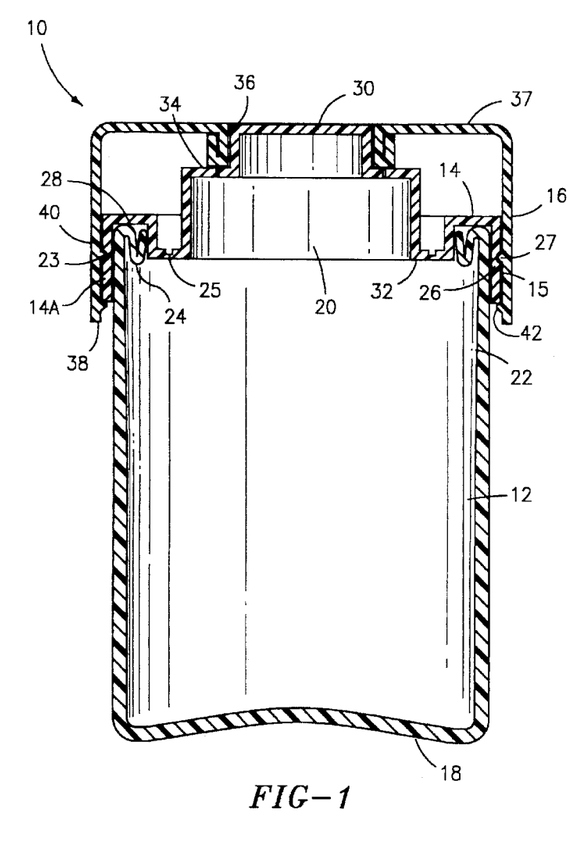
FIG. 1 is a cross-sectional view of the container and closure assembly showing the cap, cap liner and drinking glass shaped portion (at times hereafter termed "glass") in accordance with the principles of the present invention.

Referring now to the drawings in detail, there is shown in FIG. 1 a cross sectional and elevational view of the container and closure of the present invention designated generally as 10. Container and closure 10 comprises a container portion 12, a cap liner 14 and a cap 16, all preferably formed from polyethylene terephthalate (PET). The PET may be transparent, opaque or tinted, whichever is desirable.

Container portion 12 is essentially in the form of a drinking glass or cup typically used for single servings in homes, outdoors, in restaurants and bars. Container portion or drinking glass 12 may desirably have a straight side wall or a shape which diverges outwardly or inwardly from base 18 to an open end 20, although naturally other shapes can be used. Accordingly, container portion 12 has any desirable shape convenient to grasp and for drinking, and may include molded surface features or decorations such as dimples of swirls on the outer surface 22 of container portion 12.

Adjacent open end 20, container portion 12 may include a formed ring 24 bearing against cap liner and acting as an elastic sealing element therein that is urged against the liner 14 by pressure, as by carbonation, within container 12. Ring 24, if used, is formed in a cutting and folding process, discussed below. Downward leg 14A may if desired have a circumferential recess used to engage a snap ring of cap 16 such that cap 16 may be removably but securely fastened to the outer surface 26 of cap liner 14. Container portion 12 preferably has a volume to carry a single serving of liquid such as for example, soda, seltzer or beer, or non-carbonated liquids such as Juice, or any other beverage.

Cap liner 14 is the element which seals container 12 as above, or by means of a seal as described in U.S. Pat. No. 5,325,976, or by any other known sealing means, which is particularly important when a carbonated beverage is being stored in container 12 for a substantially long period of time so as to maintain the desired amount of carbonation.

The container closure assembly disclosed in U.S. Pat. No. 5,325,976 (hereinafter referred to as Valyi et al. '976), issued Jul. 5, 1994, is hereby incorporated into this application, wherein the closure member described in detail therein may be used with the present invention.

Based on the design disclosed in Valyi et al. '976, container 12 may if desired also include a recess in outer surface 22 extending therearound for engagement with a snap ring of the cap liner 16. Cap 16 may be removed from container 12 by snap ring 27 being caused to disengage from or snap out of recess 23, as described in detail in the incorporated patent. As an alternative, container 12 could include a projection or recess for engagement with a corresponding projection or recess provided in the closure member as shown in Valyi et al. '976. It is noted that Valyi et al. '976 shows a cap liner attached to the container by adhesion or welding, in place of the ring 24 acting as a sealing element, wherein the ring acting as a sealing element as shown herein is preferred.

The cap liner 14 has a stepped circular configuration such that the upper surface 34 thereof includes an extension 30. Extension 30 is preferably raised from upper surface 34, in the form of a multi-sided geometric shape, preferably hexagonal, similar to a nut fastener, shown in the top view of FIG. 2. Extension 30 is adapted to be engaged by a recess 36 of cap 16. Cap liner 14 also includes a weakened portion 25 in the lower circular surface 32 thereof. Alternatively, the multi sided element in the cap liner can be a depression adapted to be engaged by the cap as shown in FIG. 5 of Valyi et al. '976.

Cap 16, which engages and substantially covers liner 14, is used to twist liner 14 and break weakened portion 25 provided by cap liner 14, so as to expose the contents of container 12. Cap 16 is essentially a cup shaped member having a top end 37 with an opening or inner surface therein defined by recess 36, and a skirt 40, extending from top 37 defining an open bottom 38. Skirt 40 is adapted to extend over cap liner 14 and if desired engage the bottom end thereof as via a locking cam 42, which extends around the circumference of cap 16, adjacent the bottom edge thereof. Skirt 40 is of a length which may extend over a substantial portion of the body of the container 12 in assembly 10, sufficient to apply a printed decoration thereon, for example, approximately up to one third the length of the assembly 10.

Cap 16 is adapted to be placed over and onto cap liner 14 for engaging extension 30. Cap 16 together with liner 14 can be used for reclosing container portion 12 after opening, wherein locking cam 42 may if desired be provided so as to engage outer surface 23. The reclosing seal, however, need not be sufficient to withstand full carbonation pressure. Skirt 40 extends from cap 16 and is preferably of a size to hold a large insignia or other decoration, preferably by which the beverage is identified. Liner 14 may also carry a logo or decoration, and be colored, with cap 16 made from a transparent material.

Figure 2:
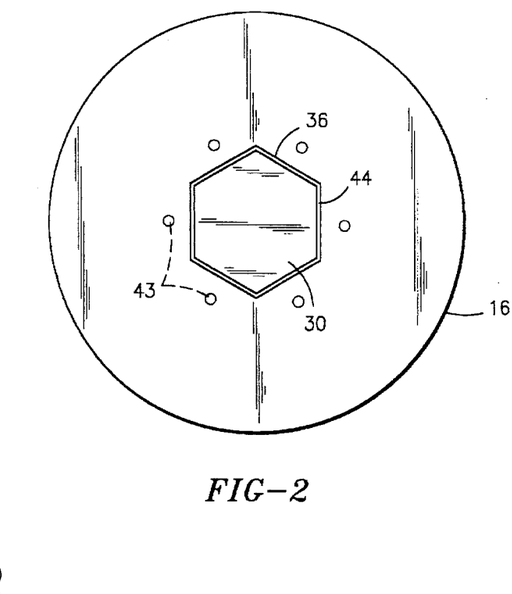
FIG. 2 is a top view of the assembly shown in FIG. 1.

Cap 16 includes wrench key recess 36 within end 37 in the shape of but slightly larger than extension 30, as shown in FIG. 2. Wrench key recess 36 securely engages extension 30 such that upon twisting of cap 16, weakened portion 25 is caused to break, freeing the contents of container 12, as described in the incorporated patent.

In using the container and closure 10, cap liner 14 may be attached to the container portion 12 as shown in FIG. 1 and/or substantially as described in the incorporated U.S. Patent, Valyi et al. '976. After container 12 is filled with the beverage and cap liner 14 installed, cap 16 is placed over cap liner 14. Cap 16 snaps over outer surface 23 such that it is securely but removably attached to container 12.

Upon twisting cap 16, the relatively weaker portion 25 of liner 14 located adjacent the inner surface of the ring 24 of container 12, shears due to the torque transmitted from wrench key recess 36 of cap 16 to extension 30 of liner 14. This process functions to open the entire top of container 12, and may also if desired serve to decompress the contents and to actuate a tampering indicator, which may be weak portion 25 itself.

Figure 1A:
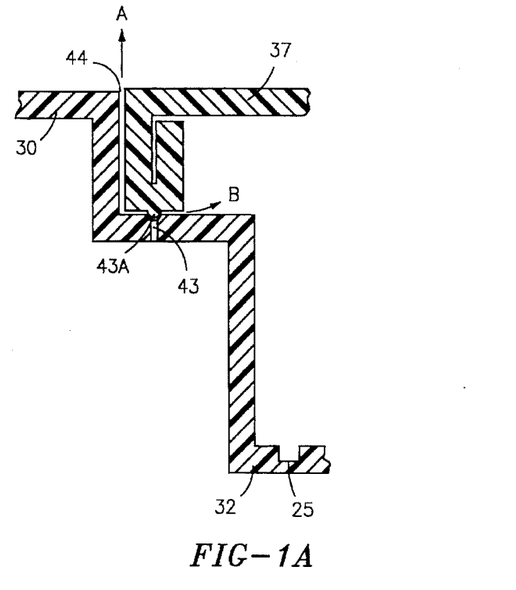
FIG. 1A is an enlarged cross-sectional view of a portion of the container closure assembly of FIG. 1.

Naturally, internal pressure against that portion of the liner which is intended to be removed may reach a force in excess of that which a person opening the container may hold. Therefore, it is necessary to release said pressure before fully fracturing the weakened portion. This may be accomplished by the arrangement of vent passages 43 in liner 14 as shown in FIGS. 1A and 2.

Thus, as weakened portion 25 is broken, the full pressure (up to several hundred pounds) acts against the liner 14 without anything holding it to keep it from being forcefully propelled away. In order to preclude this, venting of the pressure is provided before portion 25 is broken. For example, as shown in FIGS. 1A and 2, a series of small holes or vents 43 are arranged circumferentially alongside extension 30, and a series of matching plugs 43A is juxtaposed said holes as part of cap 16. The holes are kept closed due to sealing action of plugs 43A. Wrench key recess is made slightly larger than to match extension 30 with small space 44 being provided therebetween so that no torque is transmitted until an initial twisting movement will have been imparted to cap 16. The difference in dimensions is designed to be sufficient to allow for twisting cap 16 to release plugs 43A from holes 43, but not enough to thereafter preclude interference and thus transmittal of torque to weakened sections 25. Accordingly, upon initial twisting, pressure is released as shown by arrows A and B in FIG. 1A, and upon continued twisting, the weakened section 25 is broken as described above.

Figure 3:
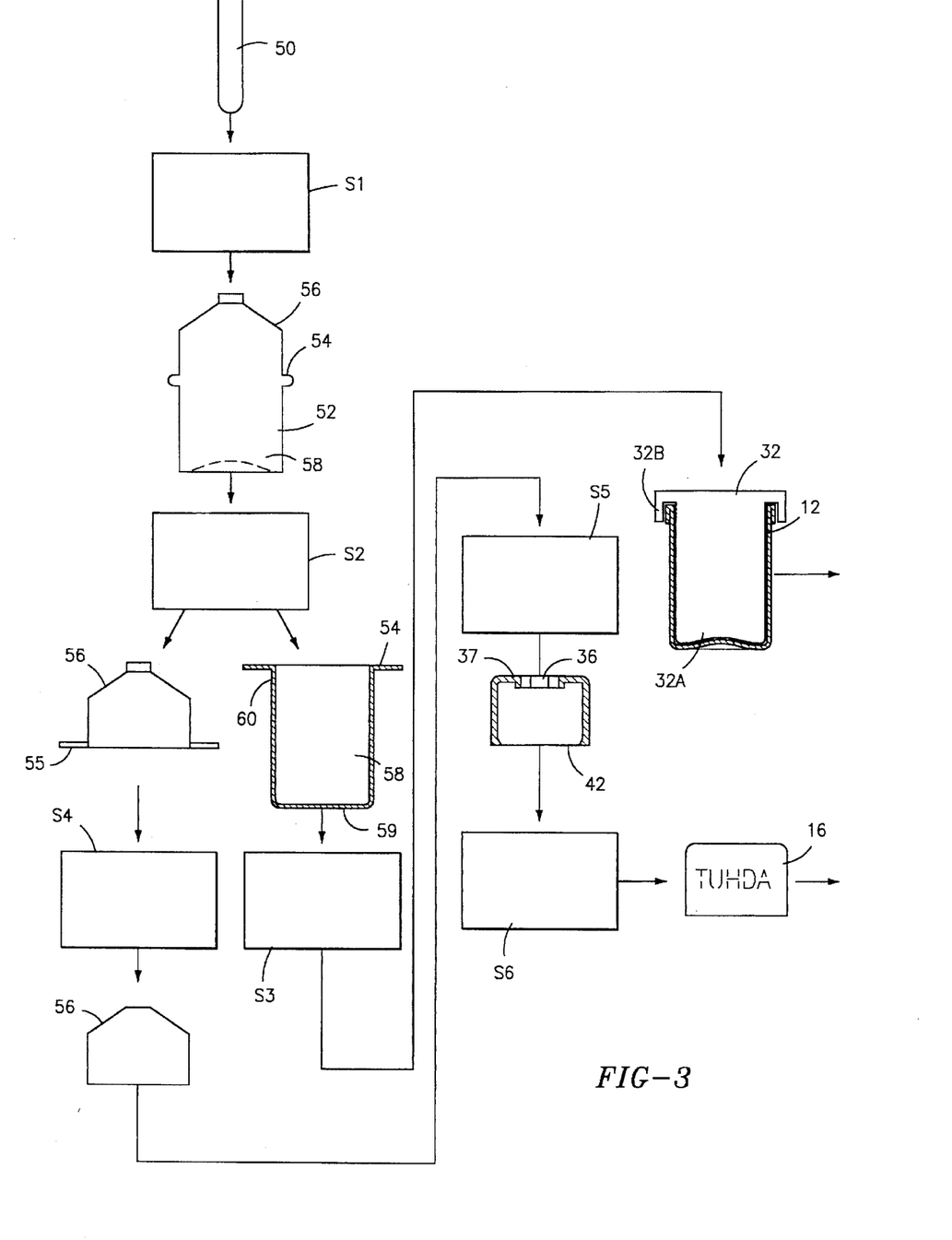
FIG. 3 is a schematic view of the process for manufacturing the elements comprising the present invention.
Figures 4, 5:
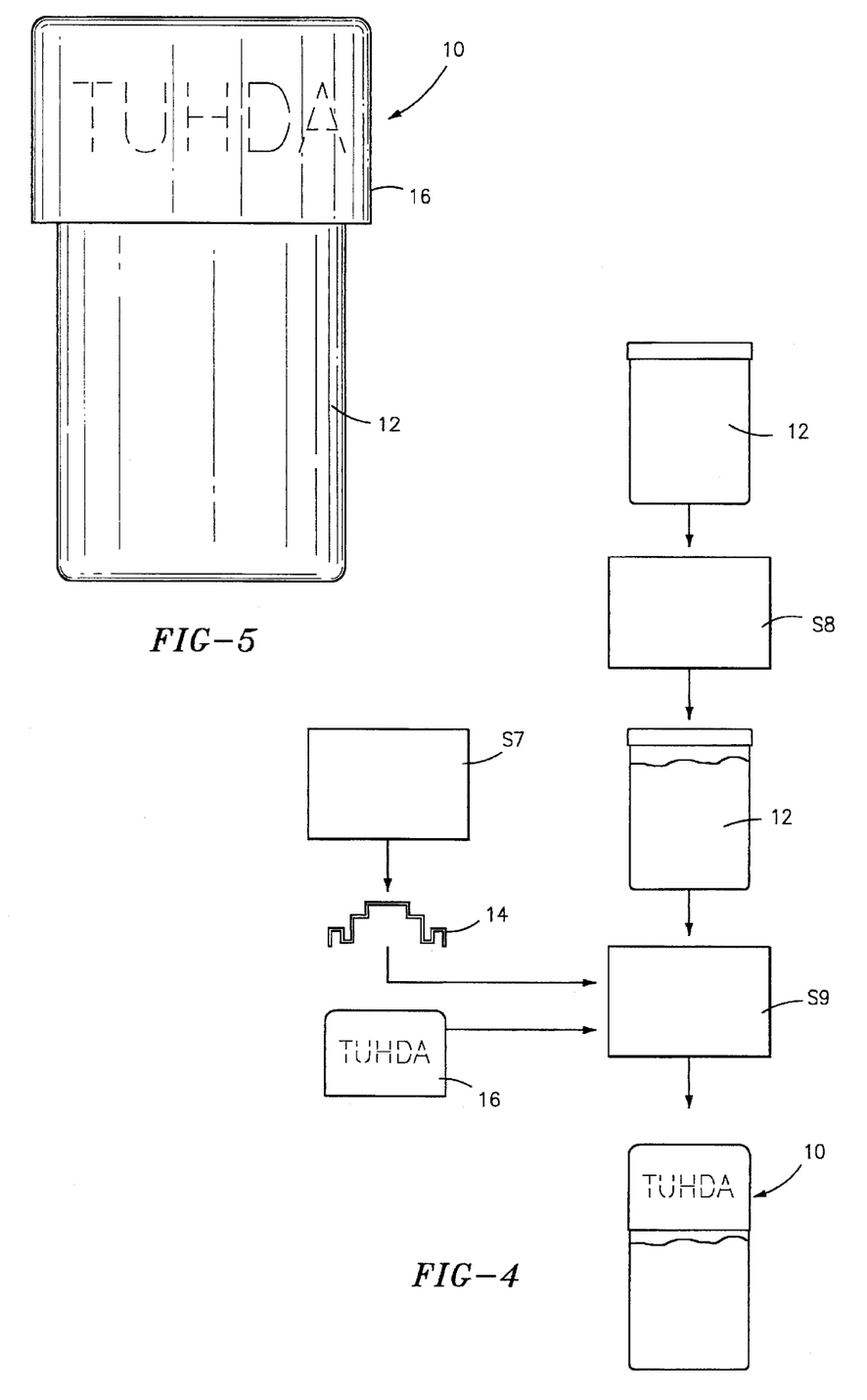
FIG. 4 is a schematic view of the process for further manufacturing and assembling the elements comprising the present invention.
FIG. 5 is an elevational view of the container and closure assembly of the instant invention.

The preferred process for forming the container and closure 10 is as follows and as shown in FIGS. 3 and 4. Referring now to FIGS. 1 and 3, container portion 12 and cap 16 and/or cap liner 14 are formed from a single, unitary preliminary container. Initially, a preform 50 is pressure molded. The preform is then stretch blow molded in step S1 into a preliminary container 52 as shown in FIG. 3, preferably having a folded, transversely extending, hollow flange 54 extending outwardly from preliminary container 52. The blow molding operation is preferably a stretch blow molding technique similar to that used for forming tennis ball cans in U.S. Pat. No. 4,576,843. The patent describes a tennis ball can blowing process which acquires full orientation of the container portions including the rim, for the purpose of rendering said rim formable in its solid state, as required when applying a can-end to said can by double seaming.

In step S2, lower body portion 58 is severed from upper shoulder and neck portion 56 through flange 54. The severing can be accomplished by any convenient means, as via a laser, a high pressure fluid jet, or with a hot knife or wire. The severing of the precontainer in forming container portion 12 is significant, since thereby brittleness in the rim section of container portion 12 is avoided, the rim section having acquired full orientation the same as the rest of the blow molded precontainer.

Unlike the tennis ball can process described in the above mentioned '843 patent, however, upper shoulder and neck portion 56 of preliminary container 52 is not discarded. Rather, in the instant invention, the cut off upper shoulder and neck portion 56 is used to form cap 16, as discussed below.

The rim section must remain formable, as in the case of the tennis ball can of the '843 patent, in order to perform the subsequent forming of the rim of container portion 12 into ring 24, to extend from the open top end of lower body portion 58 described above and to which liner 14 and cap 16 may be later applied (see FIG. 1).

Instead of this procedure, which is preferred, any other rim formation may be employed, so long as it is able to receive the closure according to the present invention, as shown in the Valyi et al. '976 patent. Alternate means of attachment, mentioned therein, such as heat sealing or welding, may then be employed, including means that require no forming of the container rim, permitting the container to be made by injection molding or direct injection blow molding, as is well known. However, the sealing procedure according to FIG. 1 herein is preferred because of the resulting simplicity of applying the closure to the container and the avoidance of sealants and the like.

Since folding requires that flange 54 be heated, the operation of folding may be combined in step S3 with crystallizing, if desired, using a heated tool 32 consisting of a mandrel 32A and a forming collar 32B with which to shape flange 54, both of which may be heated thereby shaping flange 54 and forming a crystallized container portion 12 as described above. Thus, lower body portion 58 is forwarded to tool 32, wherein flange 54 is formed into the shape shown in FIG. 1, thus finishing container 12. In addition, lower body portion 58 is crystallized in step S3 while preserving full orientation with high crystallinity throughout, including base or bottom 18. Because of its open top configuration, body portion 58 and its bottom 59 are thus crystallized in a simplified process, since a heated mandrel may thus be easily inserted to prevent shrinkage while preserving orientation during heating. Accordingly, the original dimensions are preserved without reblowing.

Referring still to FIG. 3, and regarding the formation of cap 16, in step S4 the cut off upper shoulder and neck portion 56 of preliminary container 52 is heated to a molding temperature. In step S5, the heated upper shoulder and neck portion 56 is reformed into cap 16, as by compression molding. Locking cam 42 may if desired be formed on cap 16 in the same operation. The top 37 of the upper shoulder and neck portion 56 of preliminary container 52 may be shaped to conform to wrench key recess 36 which may also have been injection molded as part of preform 50, to engage multi-sided extension 30 extending from the top of cap liner 14, as described above.

In step S6, the formed cap 16 is forwarded to decorating, where a label, logo, or other descriptive symbol is placed thereon for identifying the contents of container 12. Cap 16 and container 12 are then forwarded to a capping process, see FIG. 4, for assembling container 12 with cap liner 14 and cap 16.

If cap 16 is produced as above, the cap liner 14 is injection molded in step S7 into the shape shown in FIG. 1. Further information regarding the cap liner 14 is found in the incorporated patent '976 to Valyi et al. The finished cap liner 14 is moved to an assembly station for attachment to cap 16 and/or container 12 after filling same.

The final steps of the process include the filling and capping of container 12 and are shown in FIG. 4. At this juncture, container 12 is filled with a liquid in step S8. In step S9, container 12, cap liner 14 and cap 16 are forwarded to a two-stage capper for forming the final container and closure product 10, whereby cap 16 and cap liner 14 may have been pre-assembled. The first stage of the capping process applies cap liner 14 to the rim of container portion 12, preferably by snapping it into place, if the ring 24 of the configuration shown in FIG. 1 is used. Alternatively, seaming, welding, or other attachment means may be used.

After cap liner 14 is secured adjacent the rim of container 12, and unless pre-assembled, cap 16 is applied over liner 14 and container 12 such that locking cam 42 of cap 16 engages the bottom edge of cap liner 14 and wrench key recess 36 of cap 16 is adjacent multi-sided extension 30 of cap liner 14 for subsequent engagement as described above. This allows for the securing of cap 16 to container 12 and for subsequent opening of container 12, respectively. The finished container and closure product 10 is shown FIG. 5.

Naturally, if ductility and formability of the rim are not required, container 12 may also be produced by other methods well known in the art, e.g., injection molding.

Figure 6:
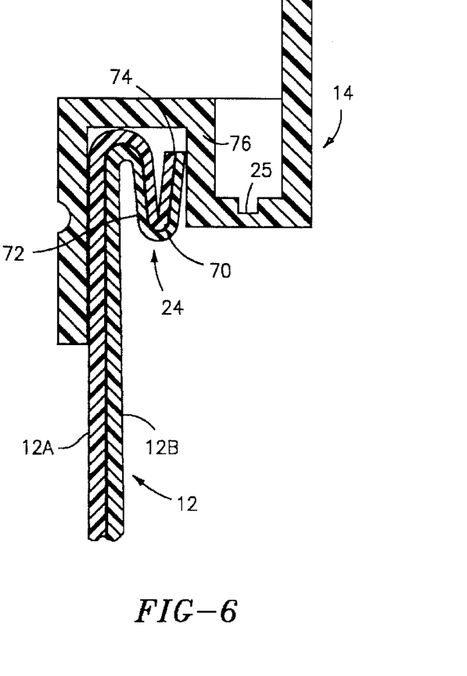
FIG. 6 is a partial sectional view of a preferred embodiment of the present invention.

In accordance with the particularly preferred embodiment of FIG. 1 shown in detail in FIG. 6, container 12 includes formed ring 24 forming the rim portion of the container and including inwardly extending folded portion 70 integrally attached to container portion 12 and engaging liner or closure 14. The inwardly extending folded portion 70 includes at least one fold 72 (although of course two or more folds may readily be provided) terminating in a flange portion 74 running generally parallel to the encircling wall of container 12. Liner or closure 14 includes a downwardly extending portion 76 also running generally parallel to the encircling wall of container 12 and engaging flange portion 74. The advantage of this embodiment is that internal pressure within container 12 will inwardly extend flange portion 70 into tighter engagement with downwardly extending portion 76 and thereby tightly seal the container against escape of carbonation from container 12 via the rim portion 23 of container 12.

Figure 7:
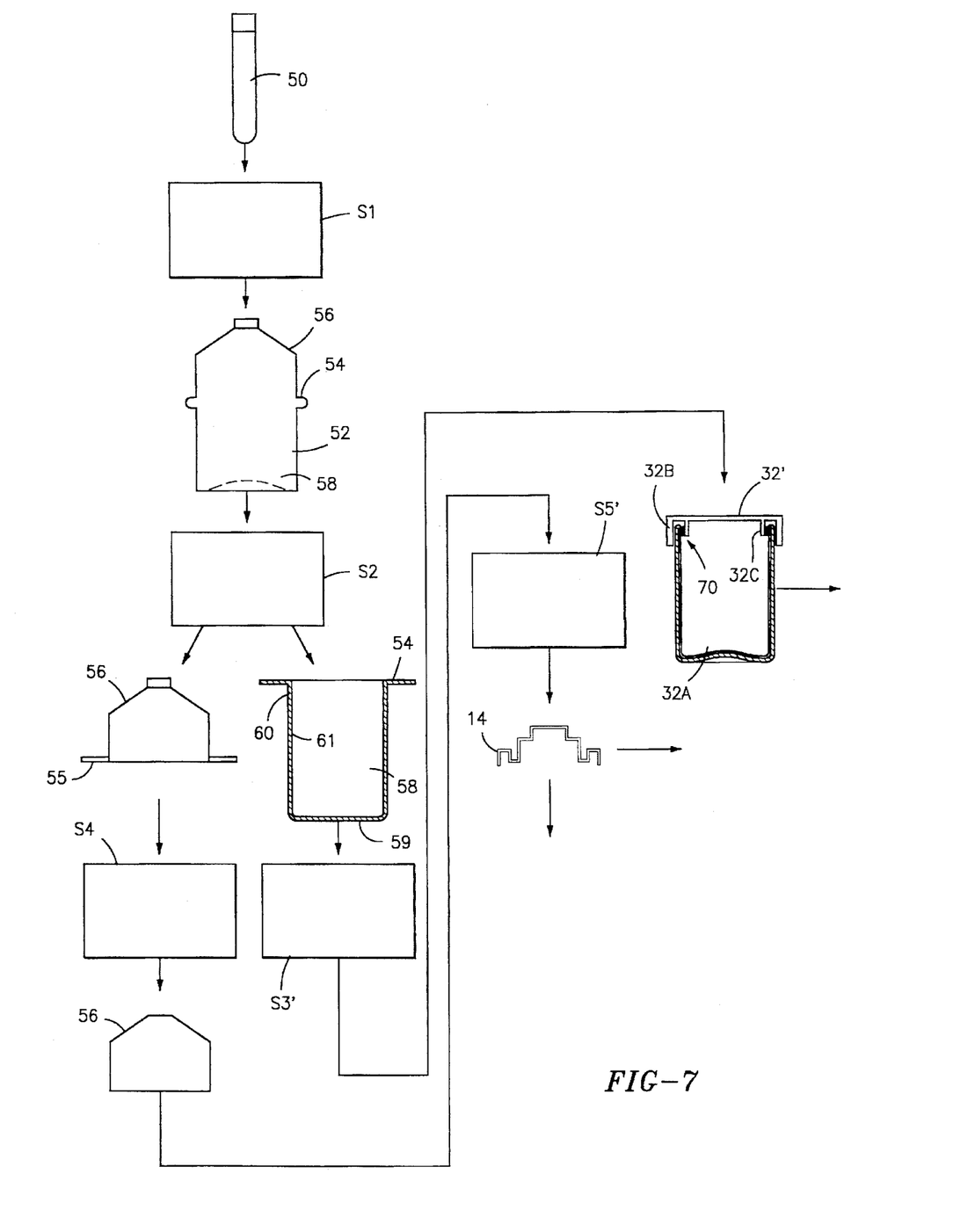
FIGS. 7 and 8 are schematic views similar to FIGS. 3 and 4 showing a preferred embodiment for manufacturing and assembling elements comprising the present invention.
Figure 8:
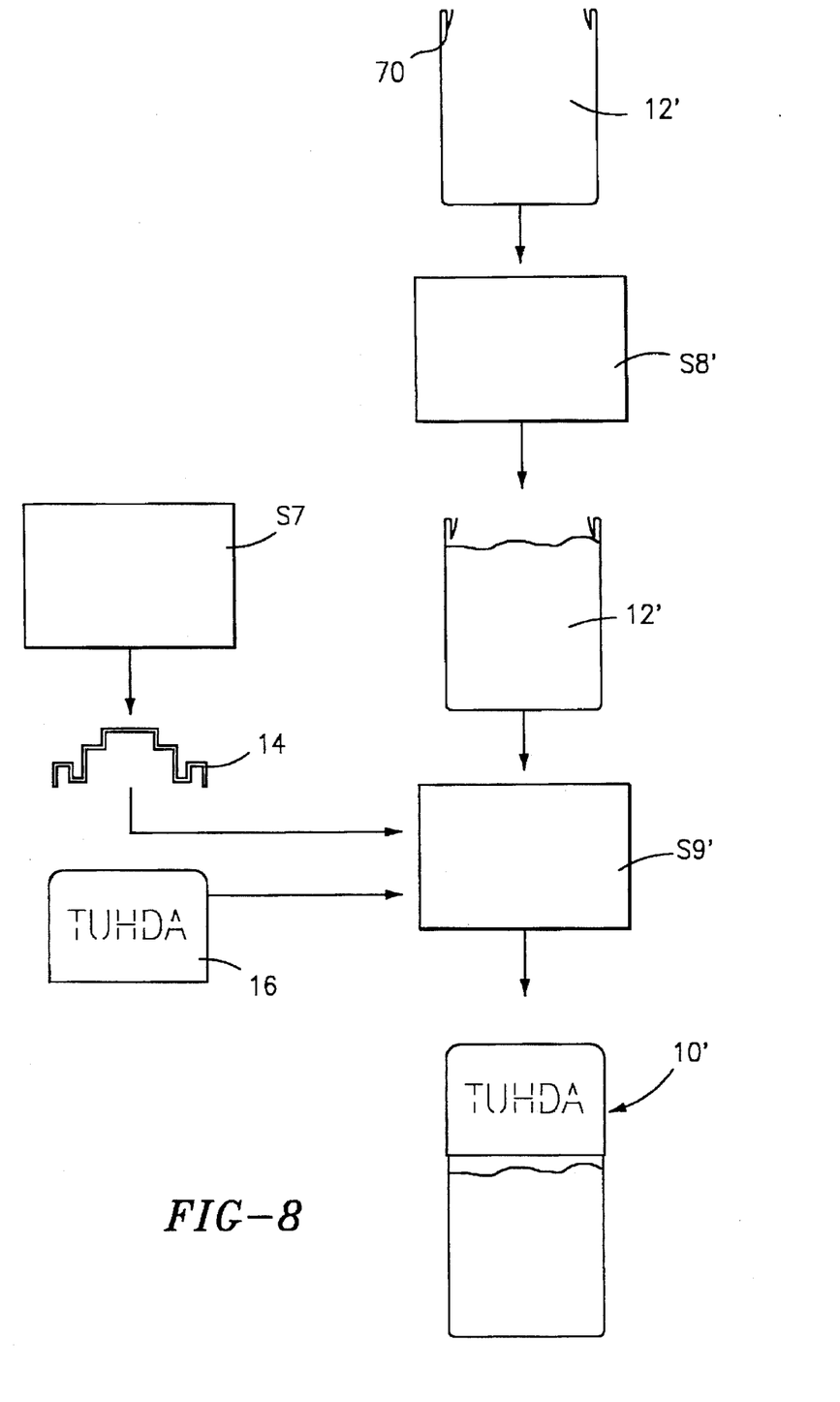

A still further embodiment of the present invention which is particularly preferred is shown in FIGS. 7 and 8 which are similar to FIGS. 3 and 4 and schematically show the process for manufacturing and assembling the elements comprising the present invention in accordance with this particularly preferred alternate embodiment. In accordance with the particularly preferred alternate embodiment shown in FIGS. 7 and 8, the shoulder and neck portion separated from the body portion of the preliminary container is formed into a closure which desirably comprises the cap liner, and a separately molded cap is placed over the cap liner. The advantages of this alternate embodiment is that the cap liner 14, which should preferably have comparable barrier properties as container 12, is thereby formed from the same materials as the body of the container, even if said container entails a laminated, or an otherwise multi-layered structure, several of which are known to be used for improved fluid retention and as shown in FIG. 6 where container includes layers 12A and 12B.

Thus, in accordance with FIGS. 7 and 8, steps S1, S2 and S4 are the same as in the embodiment of FIGS. 3 and 4. In accordance with step S3' of FIG. 7, flange 54 is formed into the folded portion 70 shown in FIG. 6 by tool 32' which includes inside downwardly extending flange 32C used to form folded portion 70. However, it should be noted that the folded portion 70 may be used with either the embodiment shown in FIGS. 7 and 8 or with the embodiment shown in FIGS. 3 and 4. In addition, in accordance with the embodiment of FIGS. 7 and 8, step S5' reforms the heated upper shoulder and neck portion 56, as by a compression mold, into liner or closure 14. As shown in FIG. 8, container body 12' including folded portion 70 is filled with a liquid in step S8' and assembled in step S9' with liner 14 and cap 16, wherein cap 16 is separately formed, as by injection molding or thermoforming, using a less expensive material than that of the container. The resultant container 10' represents a highly advantageous unit as discussed hereinbelow.

Based on the structure and process described above, container and closure 10 has an extensive shelf life for maintaining carbonation. Such shelf life is particularly useful in that it avoids excessive carbonation loss in storage and in product transfer. For generally improved shelf life, a laminate may be used for forming the preliminary container, for example, including EVOH or other well known material for enhancement of gas permeation resistance, which can be produced, for example, by coinjection or the process according to U.S. Pat. Nos. 3,955,697 and 3,929,954.

The primary advantage of this invention is that a user-friendly, aesthetically pleasing container and closure assembly is provided wherein beverages can be sealably stored, especially carbonated beverages. Another advantage of this invention is that a container and closure assembly is provided which may be used for wide openings and may use a barrier layer for sealing the container. Yet another advantage of this invention is that a container and closure assembly is provided wherein the closure sealably closes the container for maintaining pressure therein, as due to carbonation while the container is a typical drinking glass or cup-shaped container. Still another advantage of this invention is that a container and closure assembly is provided wherein decorations, including advertisements or the like can be placed on the closure assembly so as to leave the container itself free of such decorations or to reduce the cost thereof. A further advantage is that venting of gas can be easily accommodated before opening the container.

It is apparent that there has been provided in accordance with this invention a drinking glass or cup shaped container and closure which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for producing a container and closure assembly, comprising the steps of:

molding a preliminary container including a closed bottom portion, a body portion and a shoulder and neck portion;

separating the shoulder and neck portion from the body portion;

forming an open ended second container from the body portion, the second container having a rim at its open end and an encircling wall with an inner and outer surface and closing the open ended second container with a closure of a cap liner and a cap over the cap liner, wherein the closure is fitted over the second container at its open end to close said second container and wherein said liner has a weakened portion therein adapted to be broken by said cap; and including the step of forming said cap from the shoulder and neck portion, providing said cap liner and attaching the cap liner to the second container, wherein the cap liner engages the second container at its open end to close said second container, and placing said cap over the cap liner.

2. The process according to claim 1, wherein said separating occurs at a flange located between said body and shoulder portions.

3. The process according to claim 2, wherein said flange is formed into a shape adapted to engage said cap liner.

4. The process according to claim 3, wherein said flange forms a fluid retaining seal together with said cap liner.

5. The process according to claim 3, wherein said flange is folded to retain plastic formability and to effect a seal.

6. The process according to claim 1, wherein the cap and cap liners are pre-assembled and together engage with said second container at its open end to close said second container.

7. The process according to claim 1, wherein the step of forming a closure includes reforming the shoulder and neck portion into the configuration of said cap such that it fits over said cap liner and body portion.

8. The process according to claim 7, further comprising the step of providing printed indicia on the cap.

9. The process according to claim 1, wherein the shoulder and neck portion includes an upper opening and the cap liner includes a region of engagement, including the step of forming the opening into a configuration which is adapted to engage said region.

10. The process according to claim 9, wherein said engagement provides a fluid seal.

11. The process according to claim 9, further comprising the step of preserving orientation and limiting shrinkage of the open ended second container by uniformly supporting the inner surface of the second container during the step of crystallizing.

12. The process according to claim 1, wherein said preliminary container is molded from a preform having a neck, and wherein the neck of said preform forms a key adapted to engage said cap liner.

13. The process according to claim 1, further comprising the step of crystallizing the open ended second container.

14. The process according to claim 1, wherein said preliminary container is made of polyethylene terephthalate.

15. The process according to claim 1, wherein said preliminary container is a laminate of at least two plastics.

16. The process according to claim 1, including the step of providing pressure relief vents in the cap liner.

17. A process for producing a container and closure assembly, comprising the steps of:

molding a preliminary container including a closed bottom portion, a body portion and a shoulder and neck portion;

separating the shoulder and neck portion from the body portion;

forming an open ended second container from the body portion, the second container having a rim at its open end and an encircling wall with an inner and outer surface and closing the open ended second container with a closure of a cap liner and a cap over the cap liner, wherein the closure is fitted over the second container at its open end to close said second container and wherein said liner has a weakened portion therein adapted to be broken by said cap; and including the step of preparing said cap liner from the shoulder and neck portion and including the step of placing said cap over said cap liner, wherein the cap liner has a configuration interlocking with the cap and engaging the cap.

18. The process according to claim 17, wherein the step of forming a closure includes reforming the shoulder and neck portion into the configuration of said cap liner such that it fits over the body portion.

* * * * *